(12) United States Patent
Yuan et al.

(10) Patent No.: US 8,945,732 B1
(45) Date of Patent: Feb. 3, 2015

(54) DUAL-MAGNETIC LAYER HIGH ANISOTROPY MEDIA WITH ORIENTATION INITIALIZATION LAYER

(75) Inventors: Hua Yuan, Milpitas, CA (US); Alexander Chernyshov, San Jose, CA (US); B. Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 582 days.

(21) Appl. No.: 12/850,951

(22) Filed: Aug. 5, 2010

(51) Int. Cl.
*G11B 5/66* (2006.01)

(52) U.S. Cl.
USPC .......................................................... 428/828

(58) Field of Classification Search
None
See application file for complete search history.

(56) References Cited

U.S. PATENT DOCUMENTS

| | | | |
|---|---|---|---|
| 5,603,766 A | 2/1997 | Visokay et al. | |
| 5,824,409 A | 10/1998 | Sellmyer et al. | |
| 6,007,623 A | 12/1999 | Thiele et al. | |
| 6,086,974 A | 7/2000 | Thiele et al. | |
| 6,139,907 A | 10/2000 | Sellmyer et al. | |
| 6,183,606 B1 | 2/2001 | Kuo et al. | |
| 6,599,646 B2 | 7/2003 | Suzuki et al. | |
| 6,716,516 B2 | 4/2004 | Futamoto et al. | |
| 6,824,817 B2 | 11/2004 | Araki et al. | |
| 6,846,583 B2 | 1/2005 | Inaba et al. | |
| 7,241,520 B2 | 7/2007 | Shin et al. | |
| 7,282,278 B1 | 10/2007 | Nolan | |
| 7,286,324 B2 | 10/2007 | Yasui et al. | |
| 7,289,298 B2 * | 10/2007 | Maeda et al. | 360/131 |
| 8,173,282 B1 * | 5/2012 | Sun et al. | 428/831 |
| 2002/0041980 A1 | 4/2002 | Suzuki et al. | |
| 2004/0110035 A1 | 6/2004 | Shin et al. | |
| 2004/0185307 A1 | 9/2004 | Oikawa et al. | |
| 2004/0191578 A1 | 9/2004 | Chen et al. | |
| 2005/0233174 A1 * | 10/2005 | Munteanu et al. | 428/828 |
| 2006/0187743 A1 | 8/2006 | Carreras | |
| 2006/0222902 A1 * | 10/2006 | Mukai | 428/827 |
| 2007/0026262 A1 | 2/2007 | Maeda | |
| 2007/0031705 A1 * | 2/2007 | Hattori et al. | 428/827 |
| 2007/0195459 A1 * | 8/2007 | Suwa et al. | 360/135 |
| 2007/0292720 A1 * | 12/2007 | Suess | 428/828.1 |
| 2008/0311430 A1 | 12/2008 | Chen et al. | |

FOREIGN PATENT DOCUMENTS

| | | | | |
|---|---|---|---|---|
| WO | 2008/030199 A1 | 3/2008 | | |
| WO | WO 2008030199 A1 * | 3/2008 | | G11B 5/84 |

* cited by examiner

*Primary Examiner* — Holly Rickman
*Assistant Examiner* — Linda Chau

(57) ABSTRACT

A recording medium comprising a magnetic recording layer having an axis of magnetic anisotropy substantially perpendicular to the surface thereof, a soft magnetic underlayer disposed under the magnetic recording layer and physically coupled to the magnetic recording layer through one or more intermediate layers magnetically decoupling the soft magnetic underlayer from the magnetic recording layer, and an orientation initialization layer disposed between the magnetic recording layer and the soft magnetic underlayer.

11 Claims, 5 Drawing Sheets

DUAL-MAGNETIC LAYER HIGH ANISOTROPY MEDIA WITH ORIENTATION INITIALIZATION LAYER

TECHNICAL FIELD

This invention relates to the field of disk drives and more specifically, to $L1_0$-structured perpendicular magnetic recording media for disk drives.

BACKGROUND

For all types of substrates, magnetic recording media has begun to incorporate perpendicular magnetic recording (PMR) technology in an effort to increase areal density and is now working toward densities of 800 Gbits/in$^2$. Generally, PMR media may be partitioned into two primary functional regions: a soft magnetic underlayer (SUL) and a magnetic recording layer(s) (RL). FIG. 1 (prior art) illustrates portions of a conventional perpendicular magnetic recording disk drive system having a recording head 101 including a trailing write pole 102 and a leading return (opposing) pole 103 magnetically coupled to the write pole 102. An electrically conductive magnetizing coil 104 surrounds the yoke of the write pole 102. The bottom of the opposing pole 103 has a surface area greatly exceeding the surface area of the tip of the write pole 102. As the magnetic recording disk 105 is rotated past the recording head 101, current is passed through the coil 104 to create magnetic flux within the write pole 102. The magnetic flux passes from the write pole 102, through the disk 105, and across to the opposing pole 103 to record in the PMR layer 150. The SUL 110 enables the magnetic flux from the trailing write pole 102 to return to the leading opposing pole 103 with low impedance.

Higher areal densities are typically achieved with well-isolated smaller grains in the PMR layer 150. A higher magnetic anisotropy constant ($K_u$) is typically required to resist the demagnetization effects of the perpendicular geometry and to keep the smaller grains thermally stable to reduce media noise. US patent publication 2004/0185307 describes magnetic recording layers employing an ordered alloy such as CoPt and FePt having an $L1_0$ structure. While such an $L1_0$ ordered alloy in the PMR layer 150 can exhibit a high $K_u$ that is beneficial for thermal stability and reduction of noise, the processing temperature which is conventionally required for such ordering to occur is relatively high and therefore relatively more expensive to manufacture than lower-temperature media. High ordering temperatures may also render $L1_0$-structured recording layers incompatible with a NiP layers, thereby limiting such media to glass substrates.

As such, lowering the ordering temperature of $L1_0$-structured recording layers in the PMR layer 150 advantageously reduces the expense of media manufacture as well as advances the art toward the goal of fabricating such media on aluminum substrates. Furthermore, by lowering the ordering temperature of the $D_0$-structured recording layers, a higher $K_u$ is achieved for a given recording layer formation temperature and therefore a media structure enabling a lower ordering temperature can also be utilized to improve $K_u$ for any particular $L1_0$ alloy relative to the prior art.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Embodiments of the present invention include a recording medium comprising a magnetic recording layer, a soft magnetic underlayer (SUL) disposed under the magnetic recording layer and physically coupled to the magnetic recording layer through one or more intermediate layers magnetically decoupling the soft magnetic underlayer from the magnetic recording layer, and an orientation initialization layer (OIL) disposed between the magnetic recording layer and the soft magnetic underlayer. In some embodiments, the intermediate layers comprise a heatsink layer and a non-magnetic interlayer disposed between the magnetic recording layer and the orientation initialization layer. In other embodiments, the heatsink layer and non-magnetic interlayer are disposed between the orientation initialization layer and the soft magnetic underlayer.

In some embodiments, the OIL comprises MgO and is deposited directly on top of the SUL, which may comprise a CoFe or CoCr based soft magnetic alloy. This alloy may contain: Al, B, C, Cr, Cu, N, Nb, Ni, Re, Ru, Si, Ta and/or Zr. In certain embodiments, the magnetic recording layer has an out-of-plane coercivity greater than about 12 kOe. In further embodiments, the magnetic recording layer has an out-of-plane coercivity greater than about 15 kOe. The magnetic recording layer may comprise a FePtX alloy, wherein X is selected from the group consisting of Ag, B, BN, C, Co, Cr, Cu, MgO, Ni, $Si_3N_4$, $SiO_2$ and $TiO_2$. By way of example, the intermediate layers may comprise a (002) textured fcc material (e.g., an Ag alloy, an Au alloy or a Cu alloy), a (002) textured bcc material (e.g., a Cr alloy), and a (002) textured B2 material (e.g., RuAl or NiAl).

Figure 1:
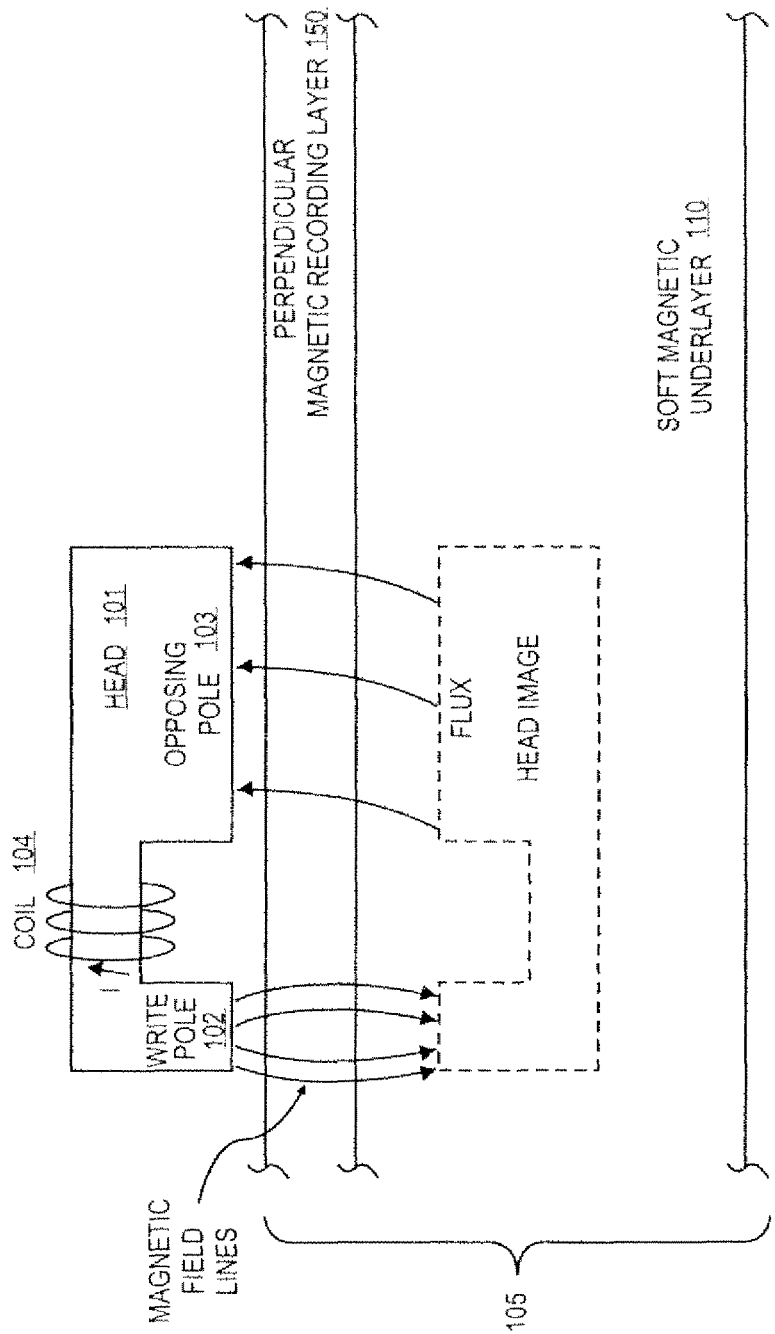
FIG. 1 (prior art) illustrates a conventional perpendicular recording disk drive system.
Figure 2:
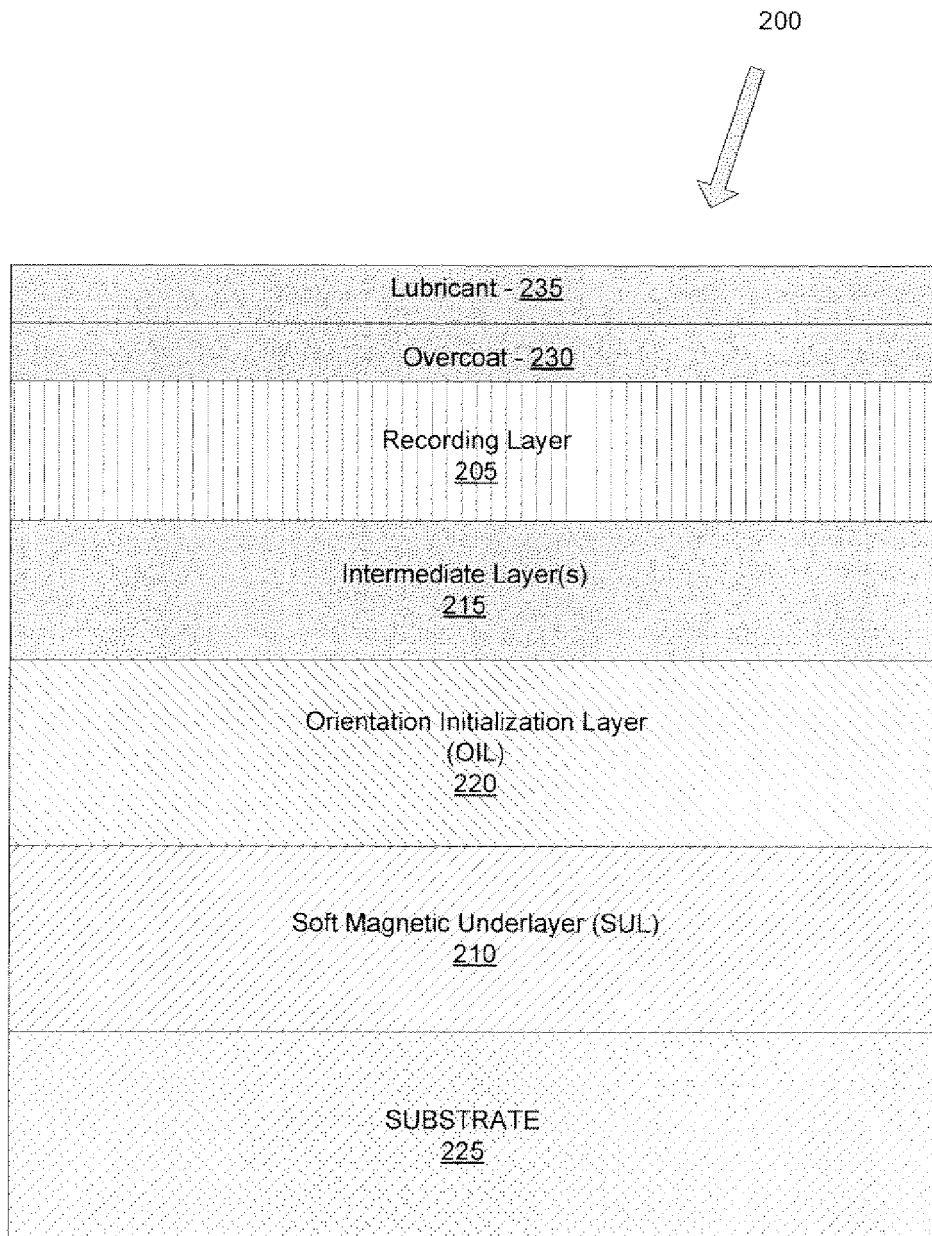
FIG. 2 illustrates a cross-sectional view of an exemplary heat assisted magnetic recording (HAMR) media, in accordance with an embodiment of the present invention.

FIG. 2 illustrates a cross-sectional depiction of an exemplary embodiment of a heat assisted magnetic recording (HAMR) media 200 including a hard magnetic recording layer 205, a soft magnetic underlayer (SUL) 210 disposed under the magnetic recording layer 205 and physically coupled to the magnetic recording layer 205 by way of one or more intermediate layers 215. These intermediate layers 215 act to magnetically decouple the SUL 210 from the magnetic recording layer 205. The illustrated HAMR media 200 further comprises an orientation initialization layer (OIL) 220 disposed between the magnetic recording layer 205 and the SUL 210, which is formed directly on substrate 225. It should be appreciated that the layers discussed herein may be formed on both sides of substrate 225 to form a double-sided magnetic recording disk. However, only the layers on a single side of substrate 225 are shown for ease of illustration. Alternatively, a single sided perpendicular magnetic recording disk may also be formed. The HAMR media must be deposited at high temperature in order to obtain atomic ordering and high magnetocrystalline anisotropy (Ku). During this high temperature heating process, the amorphous SUL 210 at the bottom of the media stack is crystallized such that it enhances the crystallographic texture of the intermediate layers 215 and magnetic recording layer 205.

Figure 3:
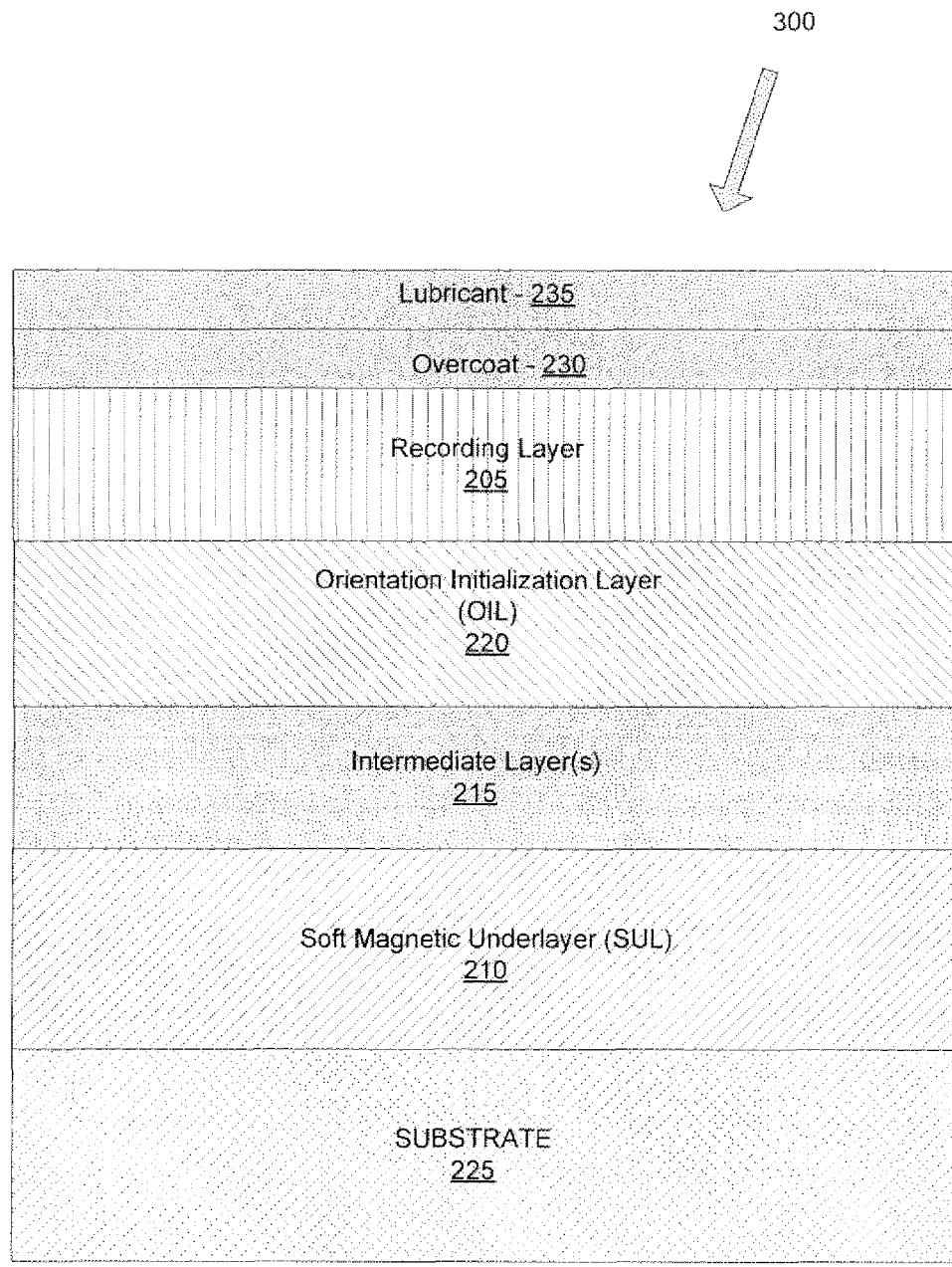
FIG. 3 illustrates a cross-sectional view of another exemplary HAMR media, in accordance with an embodiment of the present invention.

The one or more intermediate layers 215 may comprise, for example, a heatsink layer and a non-magnetic interlayer. In the embodiment illustrated in FIG. 2, these intermediate layers 215 are disposed between the magnetic recording layer 205 and the orientation initialization layer 220. FIG. 3 illustrates a cross-sectional depiction of another exemplary embodiment of HAMR media 300 in which the one or more intermediate layers 215 are disposed in an alternative location, and in which similar layers have been numbered and labeled accordingly. In particular, the intermediate layers 215 are located between the orientation initialization layer 220 and the soft magnetic underlayer 210.

With further reference to FIGS. 2 and 3, the substrate 225 may comprise, for example, a glass, a metal, and/or a metal alloy material. In a particular embodiment, the substrate 225 is disk-shaped or annular. Glass substrates that may be used include, for example, a silica-containing glass such as borosilicate glass and aluminosilicate glass. Metal and metal alloy substrates that may be used include, for example, aluminum (Al), tantalum (Ta), and aluminum magnesium (AlMg) substrates. In an alternative embodiment, other substrate materials such as polymers and ceramics may be employed.

Generally, the SUL 210 may include any materials known in the art. In particular embodiments, the SUL comprises a CoFe or CoCr based soft magnetic alloy. This alloy may contain on or more of the following materials: Al, B, C, Cr, Cu, N, Nb, Ni, Re, Ru, Si, Ta and Zr. By way of example, the SUL 210 may comprise CoFeTaZr having a thickness of about 40 nm. As stated, the amorphous SUL 210 at the bottom of the media stack is crystallized during the high temperature heating process when the HAMR media is deposited, such that it enhances the crystallographic texture of the magnetic recording layer 205.

As depicted, the OIL 220 is disposed between the magnetic recording layer 205 and the SUL 210. In some embodiments, the OIL 220 comprises MgO having a thickness of about 4 nm. As illustrated, the OIL 220 is directly deposited on top of the SUL 210 such that it develops very good (002) crystallographic texture, and such that subsequent intermediate layers 215 can form good crystallographic texture on this (002) textured MgO seedlayer. The OIL 220 provides a buffer layer that eliminates the negative effect due to SUL crystallization, and also promotes proper crystallographic texture and a smooth surface for the intermediate layers 215 and the magnetic recording layer 205. As such, the OIL 220 enables the integration of the SUL 210 and the intermediate layers 115 into the HAMR stack without degrading the media properties. This enables the flyable recording media to have good magnetic properties and a roughness of approximately 5-8 Å. Additionally, this enables the magnetic recording layer to have an out-of-plane coercivity greater than about 12-15 kOe. Furthermore, this also improves $H_n$ from −2kOe up to −7kOe, and maintains greater than 30 kOe $H_k$ with the crystallized SUL 210.

Disposed between the OIL 220 and recording layer 205 are one or more intermediate layers 215, which may include a heatsink layer and a non-magnetic interlayer. By way of example, the intermediate layers 215 may comprise a (002) textured fcc material (e.g., an Ag alloy, an Au alloy or a Cu alloy), a (002) textured bcc material (e.g., a Cr alloy), and/or a (002) textured B2 material (e.g., RuAl or NiAl). In one exemplary embodiment, the intermediate layers 215 comprise (i) a thin layer of (002) textured $CrRu_{10}B_3$ disposed over the OIL 220 (or SUL 210), and (ii) a thin layer of (002) textured MgO disposed over the $CrRu_{10}B_3$ layer. In another exemplary embodiment, the intermediate layers 215 comprise (i) a thin layer of (002) textured AgPd disposed over the OIL 220 (or SUL 210), (ii) a thin layer of (002) textured CuZr disposed over the AgPd layer, (iii) another SUL disposed over the CuZr layer, and (iv) a thin layer of (002) textured MgO disposed over the additional SUL.

The above-identified thin films comprising the intermediate layers 215 have good lattice parameter match with $L-1_0$ FePt. The FePt grain size in the granular magnetic recording layer can be controlled by both interlayer grain structure and dopant (e.g., C or oxides) content in the FePt layer. The intermediate layers 215 regulate the magnetic exchange coupling between the SUL 210 and recording layer 205. The OIL 220 further serves to transfer texture to the recording layer 205 so that $L1_0$ ordering occurs. The heatsink layer facilitates heat transfer in energy-assisted magnetic recording embodiments (e.g., (HAMR). It is employed to achieve rapid media cooling after writing in energy assisted magnetic recording.

Disposed over the intermediate layers 215 is the magnetic recording layer 205 having a relatively higher out of plane coercivity than that of the SUL 210. The magnetic recording layer 205 may be a single material layer or a composite including a plurality of layers of differing material composition and/or magnetic property.

In the HAMR media structure 200, at least one layer of the magnetic recording layer 205 is an $L1_0$ ordered alloy, such as FePtX or CoPtX. In the exemplary embodiment, the magnetic recording layer 205 is an FePtX alloy, with a concentration of iron (Fe), platinum (Pt), and X to form a $(Fe_xPt_yX_{1-(x+y)})$ metal alloy, such as FePtC. For FePtC embodiments, the carbon content is below 50 at. % and preferably below about 40%. Constituents other than carbon may also be utilized in the FePtX alloy, such as, Ag, B, BN, C, Co, Cr, Cu, MgO, Ni, $Si_3N_4$, $SiO_2$ and $TiO_2$, for example, to stabilize the phase or tune the magnetic properties of the recording layer 205. As stated, the OIL 220 enables the magnetic recording layer to have an out-of-plane coercivity greater than about 12-15 kOe.

With further reference to FIGS. 2 and 3, overcoat 230 and lubricant 235 layers may be formed on the recording layer 205. For example, overcoat 230 may be formed on top of the magnetic recording layer 205 to meet tribological requirements such as contact-start-stop (CSS) performance and corrosion protection. Predominant materials for the overcoat layer 230 are carbon-based materials, such as hydrogenated or nitrogenated carbon. A lubricant 235 may be placed (e.g., by dip coating, spin coating, etc.) on top of the overcoat layer 230 to further improve tribological performance. Exemplary lubricants include a perfluoropolyether or phosphazene lubricant or a composite thereof.

Figure 4:
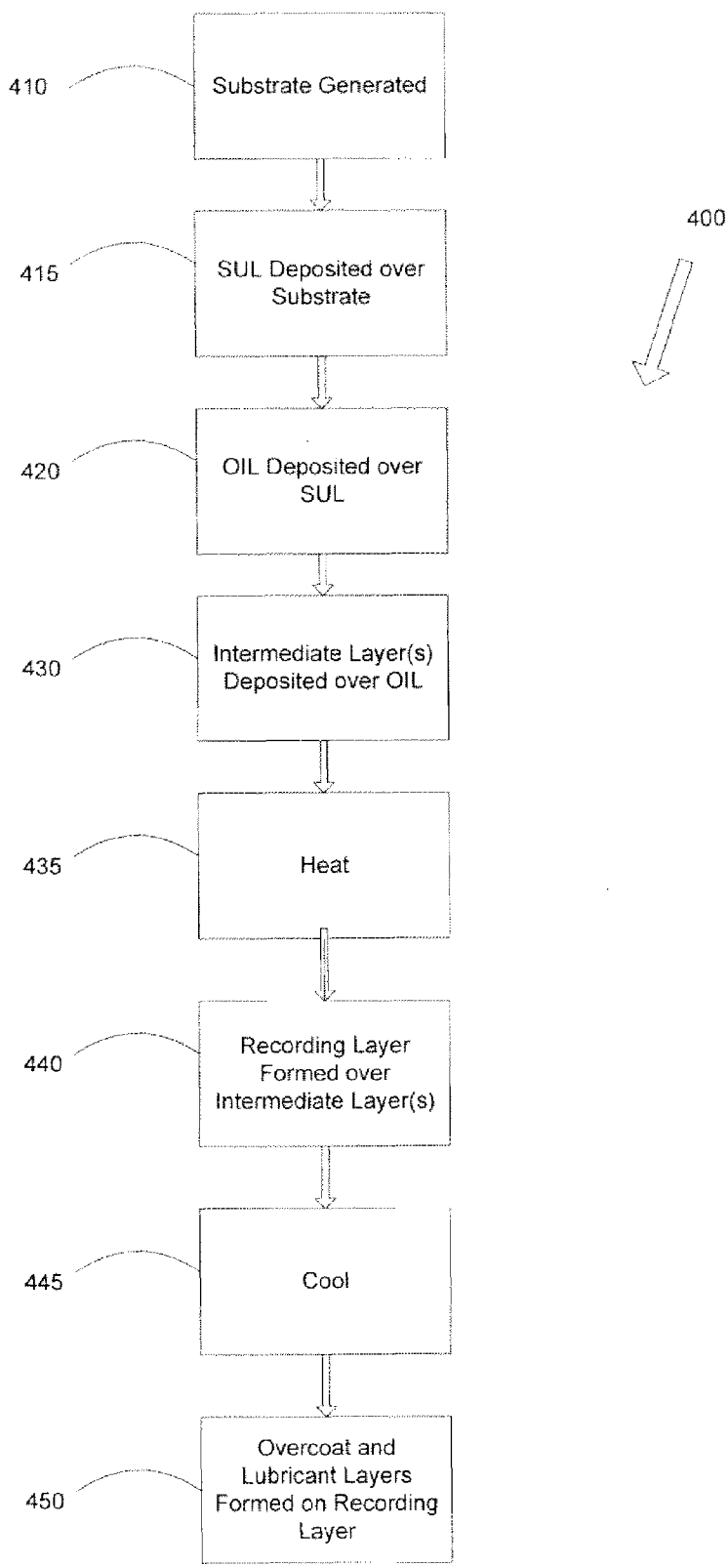
FIG. 4 illustrates a method of manufacturing a HAMR media, in accordance with an embodiment of the present invention.

FIG. 4 illustrates one embodiment of a method 400 of manufacturing a perpendicular magnetic recording disk having a FePt-based HAMR media structure such as that described elsewhere herein in reference to FIGS. 2 and 3. A substrate 225 is generated, or otherwise provided, at operation 410. The generation of a substrate for a magnetic recording disk is per se known in the art; accordingly a detailed discussion is not provided. At operation 415, the SUL 210 including any of the materials described elsewhere herein, such as a CoFe or CoCr based soft magnetic alloy, is deposited over the substrate 225. Any conventional deposition method configured for the formation of the SUL 210 may be utilized, such as sputter deposition (i.e., physical vapor deposition (PVD)).

At operation 420 the OIL 220 comprising any of the materials described elsewhere herein, such as MgO, is deposited over the SUL 210. In alternative embodiments, the intermediate layers 215 are deposited over the SUL 210 and an MgO layer is deposited directly on the intermediate layers 215. Although any deposition method may be employed at operation 420, in the exemplary embodiment the OIL 220 is sputter deposited with predominantly (002) texture to promote the $L1_0$-ordering of the recording layer 205. Such texture may be achieved with sputter deposition while the substrate is at a temperature of between approximately 50° C. and 300° C.

At operation 430, the intermediate layers 215 are deposited over the OIL 220. The intermediate layers may be deposited, for example, using sputter deposition. The stack is heated to approximately 455° C. at operation 435. At operation 440 the recording layer 205 is formed on the intermediate layers 215. In a particular embodiment, the magnetic recording layer 205 is deposited at a pressure between approximately 5 mTorr and 90 mTorr. The stack is cooled to approximately 100° C. at operation 445.

After heating the stack to around 455° C., the as-deposited amorphous SUL layer forms at least two sub-layers having different materials, crystallographic structures and compositions. Specifically, the bottom sub-layer remains amorphous due to the presence of high Ta, Zr content. This sub-layer decreases film roughness caused by thick heatsink films deposited underneath. The top sub-layer may form a uniformly crystallized (002) textured CoFe (or CoCr) layer, as determined by preliminary x-ray diffraction methods. This layer improves the (002) texture of the thin MgO OIL 220. In addition, due to the smoothness of the bottom amorphous SUL sub-layer, the roughness of the OIL 220 and the recording layer 205 is greatly reduced. FePt is found to have high $H_c$ on top of the disclosed OIL 220 and recording layer 205.

In one embodiment, a granular FePtC alloy layer containing less than 50 at. % carbon, and having any of the compositions discussed elsewhere herein, is formed with $L1_0$ ordering to a thickness between 3 nm and 15 nm. For one such embodiment, the $L1_0$-ordered recording layer 205 formed has an out-of-plane coercivity of at least 12-15 kOe. The method 400 is then completed at operation 450 where overcoat 230 and lubricant 235 layers are placed on the recording layer 205. As stated, the overcoat 230 may be formed on top of the magnetic recording layer 205 to meet tribological requirements such as contact-start-stop (CSS) performance and corrosion protection. In addition, the lubricant 235 may be placed (e.g., by dip coating, spin coating, etc.) on top of the overcoat layer 230 to further improve tribological performance.

The deposition of each of the SUL 210, OIL 220, and recording layer 205 may be accomplished by a variety of methods known in the art, for example, electroless plating, sputtering (e.g., static or in-line), chemical vapor deposition (CVD), ion-beam deposition (IBD), etc. Exemplary static sputter systems are available from manufacturers such as Intevac Inc. of Santa Clara, Calif. and Canon-Anelva Corp. of Japan. With in-line sputtering systems, disk substrates are loaded on a pallet that passes through a series of deposition chambers the deposit films successively on substrates. In-line sputtering systems are available from manufacturers such as Ulvac Corp. of Japan.

Figure 5:
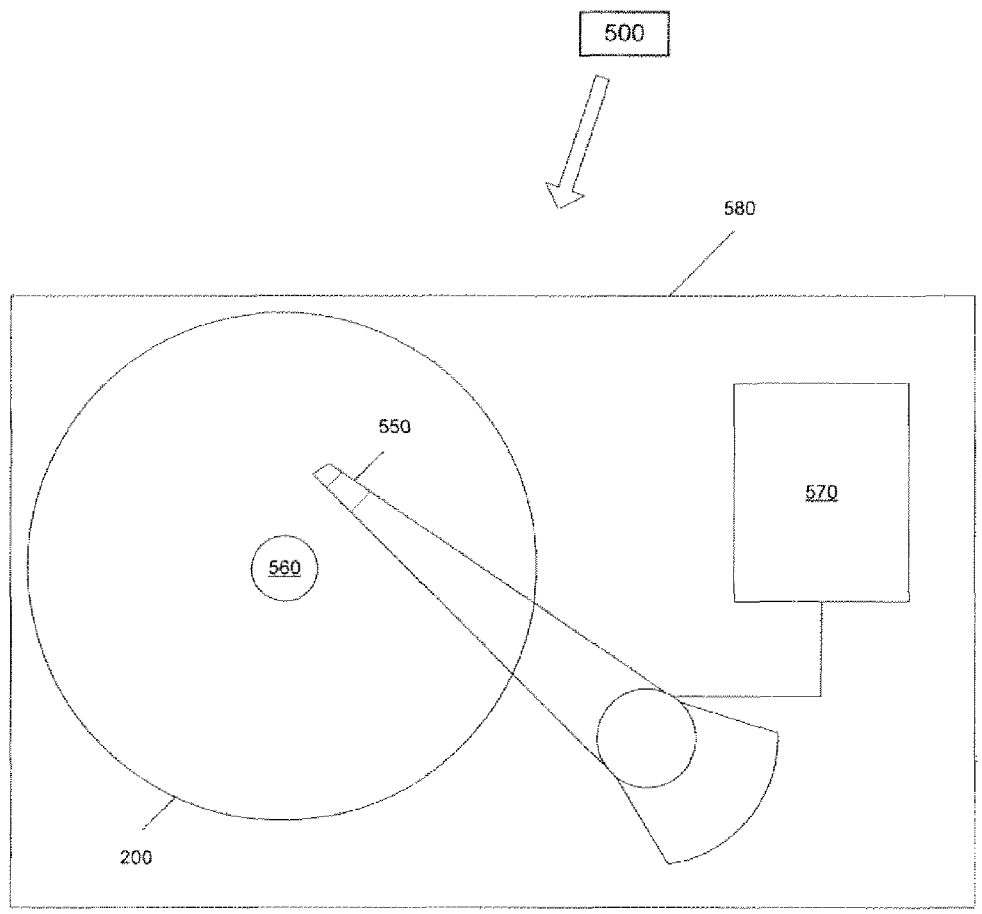
FIG. 5 illustrates a disk drive including a perpendicular magnetic recording disk, in accordance with an embodiment of the present invention.

FIG. 5 illustrates a disk drive 500 having disk 200. Disk drive 500 may include one or more disks 200 to store data. In some embodiments, the disk 300 has the media structure as depicted in FIG. 2 or FIG. 3. Disk 200 resides on a spindle assembly 560 that is mounted to drive housing 580. Data may be stored along tracks in the magnetic recording layer of disk 200. The reading and writing of data is accomplished with head 550 that has both read and write elements. The write element is used to alter the properties of the perpendicular magnetic recording layer of disk 200. In one embodiment, head 550 may have magneto-resistive (MR), or giant magneto-resistive (GMR) elements. In an alternative embodiment, head 550 may be another type of head, for example, an inductive read/write head or a Hall effect head. The disk drive 500 may be a heat assisted magnetic recording (HAMR) drive and incorporate components of a laser source, a waveguide, and a near-field transducer (not depicted). Techniques in generating and focusing a laser beam are known in the art, and thus, are not described in particular detail. A spindle motor (not shown) rotates spindle assembly 960 and, thereby, disk 200 to position head 550 at a particular location along a desired disk track. The position of head 550 relative to disk 200 may be controlled by position control circuitry 570. The use of disk 200 fabricated in the manners discussed above may improve the performance of the perpendicular magnetic recording layer of disk 200 by providing a higher magnetic anisotropy from an $L1_0$-ordered recording layer. The use of disk 200 fabricated in the manners discussed above may also enable the use of $L1_0$-structured media on non-glass substrates.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A recording medium comprising:
   a magnetic recording layer having an axis of magnetic anisotropy substantially perpendicular to the surface thereof;
   a soft magnetic underlayer disposed under the magnetic recording layer and physically coupled to the magnetic recording layer through one or more intermediate layers magnetically decoupling the soft magnetic underlayer from the magnetic recording layer, wherein the one or more intermediate layers comprise a heatsink layer and a non-magnetic interlayer disposed between the magnetic recording layer and an orientation initialization layer, wherein the one or more intermediate layers comprise a layer of (002) textured $CrRu_{10}B_3$ disposed over the orientation initialization layer, and a layer of (002) textured MgO disposed over the $CrRu_{10}B_3$ layer; and the orientation initialization layer disposed between the magnetic recording layer and the soft magnetic underlayer, wherein the orientation initialization layer comprises a single layer of MgO.

2. The recording medium as in claim 1, wherein the orientation initialization layer is deposited directly on top of the soft magnetic underlayer.

3. The recording medium as in claim 1, wherein the soft magnetic underlayer comprises a CoFe or CoCr based soft magnetic alloy.

4. The recording medium as in claim 3, wherein the CoFe or CoCr based alloy contains one or more additional elements selected from the group consisting of: Al, B, C, Cr, Cu, N, Nb, Ni, Re, Ru, Si, Ta and Zr.

5. The recording medium of claim 1, wherein the magnetic recording layer has an out-of-plane coercivity greater than about 12 kOe.

6. The recording medium of claim 1, wherein the magnetic recording layer has an out-of-plane coercivity greater than about 15 kOe.

7. The recording medium of claim 1, wherein the magnetic recording layer comprises a FePtX alloy, wherein X is selected from the group consisting of Ag, B, BN, C, Co, Cr, Cu, MgO, Ni, $Si_3N_4$, $SiO_2$ and $TiO_2$.

8. The recording medium of claim 7, wherein the FePtX alloy comprises an $L1_0$-ordered alloy of FePtC.

9. A recording device comprising:

a recording head for reading magnetic signals from, and writing magnetic signals to, a recording medium; and a recording medium configured for perpendicular recording, the recording medium further comprising:

a magnetic recording layer having an axis of magnetic anisotropy substantially perpendicular to the surface thereof;

a soft magnetic underlayer disposed under the magnetic recording layer and physically coupled to the magnetic recording layer through one or more intermediate layers magnetically decoupling the soft magnetic underlayer from the magnetic recording layer, wherein the one or more intermediate layers comprise a heatsink layer and a non-magnetic interlayer disposed between the magnetic recording layer and an orientation initialization layer, wherein the one or more intermediate layers comprise a layer of (002) textured $CrRu_{10}B_3$ disposed over the orientation initialization layer, and a layer of (002) textured MgO disposed over the $CrRu_{10}B_3$ layer; and the orientation initialization layer disposed between the magnetic recording layer and the soft magnetic underlayer, wherein the orientation initialization layer comprises a single layer of MgO.

10. The recording medium as in claim 9, wherein the orientation initialization layer is deposited directly on top of the soft magnetic underlayer.

11. The recording medium as in claim 9, wherein the soft magnetic underlayer comprises a CoFe or CoCr based soft magnetic alloy.

\* \* \* \* \*